(12) United States Patent
Watanabe et al.

(10) Patent No.: US 10,982,726 B2
(45) Date of Patent: Apr. 20, 2021

(54) CONTROL SYSTEM FOR VEHICLE

(71) Applicant: TOYOTA JIDOSHA KABUSHIKI KAISHA, Aichi (JP)

(72) Inventors: Hideo Watanabe, Toyota (JP); Junya Mizuno, Shizuoka-ken (JP); Toshiyuki Tomita, Susono (JP)

(73) Assignee: TOYOTA JIDOSHA KABUSHIKI KAISHA, Aichi-Ken (JP)

( * ) Notice: Subject to any disclaimer, the term of this patent is extended or adjusted under 35 U.S.C. 154(b) by 0 days.

(21) Appl. No.: 16/789,428

(22) Filed: Feb. 13, 2020

(65) Prior Publication Data

US 2020/0263743 A1    Aug. 20, 2020

(30) Foreign Application Priority Data

Feb. 14, 2019    (JP) .................. 2019-024377

(51) Int. Cl.
*F16D 48/06*    (2006.01)

(52) U.S. Cl.
CPC ...... *F16D 48/06* (2013.01); *F16D 2500/3166* (2013.01); *F16D 2500/7041* (2013.01)

(58) Field of Classification Search
CPC .......... F16D 48/06; F16D 48/08; F16D 48/10; F16D 2500/102; F16D 2500/10406; F16D 2500/106; F16D 2500/3026; F16D 2500/30415; F16D 2500/3067; F16D 2500/3068; F16D 2500/3166; F16D 2500/5012; F16D 2500/5018; F16D 2500/5023; F16D 2500/50233; F16D 2500/50236; F16D 2500/50245; F16D 2500/50251; F16D 2500/50263; F16D 2500/50269; F16D 2500/7041
See application file for complete search history.

(56) References Cited

U.S. PATENT DOCUMENTS

| | | | |
|---|---|---|---|
| 9,989,110 B2* | 6/2018 | Kim | .................. F16D 48/06 |
| 10,316,906 B2* | 6/2019 | Yoon | .................. F16D 48/06 |
| 2017/0009825 A1* | 1/2017 | Kim | .................. B60W 10/02 |
| 2017/0089412 A1 | 3/2017 | Oshiumi | |
| 2017/0166196 A1* | 6/2017 | Park | ............... F16D 48/066 |
| 2018/0283535 A1* | 10/2018 | Kubo | ............... F16H 61/0213 |

FOREIGN PATENT DOCUMENTS

| | | |
|---|---|---|
| JP | 2002-286056 A | 10/2002 |
| JP | 2002-286123 A | 10/2002 |
| JP | 2015-218740 A | 12/2015 |

\* cited by examiner

*Primary Examiner* — Edwin A Young
(74) *Attorney, Agent, or Firm* — Hauptman Ham, LLP (57) ABSTRACT

A control system for a vehicle configured to accurately learn an initial engagement position of a clutch. The control system is applied to a vehicle comprising a clutch that selectively transmits power between a prime mover and drive wheels, and a detector that detects an input speed of the clutch rotated by the prime mover. A controller executes a learning of the initial engagement position of the clutch, if a reaction time until an input speed of the clutch is changed by engaging the clutch gradually while maintaining the input speed of the clutch to a constant speed is shorter than a threshold period of time.

7 Claims, 9 Drawing Sheets

CONTROL SYSTEM FOR VEHICLE

CROSS REFERENCE TO RELATED APPLICATIONS

The present disclosure claims the benefit of Japanese Patent Application No. 2019-024377 filed on Feb. 14, 2019 with the Japanese Patent Office, the disclosure of which are incorporated herein by reference in its entirety.

BACKGROUND

Field of the Disclosure

Embodiments of the present disclosure relate to the art of a control system for a vehicle having a clutch selectively interrupt power transmission between a prime mover and a pair of drive wheels, and more especially, to a control system configured to learn an engagement point of the clutch.

Discussion of the Related Art

JP-A-2015-218740 describes a control system for a clutch which can curb reduction of a control response due to abrasion of contact surfaces of engaging elements. The control system taught by JP-A-2015-218740 is applied to a clutch including a first engaging element (i.e., a pressure plate) and a second engaging element (i.e., a clutch disc and a friction material). According to the teachings of JP-A-2015-218740, the control system is configured to learn an engagement start position of the clutch at which the first engaging element starts contacting to the second engaging element, according to a rotational speed of one of the first engaging element and the second engaging element.

JP-A-2002-286123 and JP-A-2002-286056 describe torque point learning methods for a clutch disposed between an engine and a transmission. According to the teachings of JP-A-2002-286123 and JP-A-2002-286056, a torque point of a wet multiple disc clutch is learnt during engaging operation. Specifically, a speed of the engine and an input speed to the clutch are detected while engaging the clutch gradually, and when the input speed to the clutch is reduced predetermined value with respect to the speed of the engine, a duty ratio at this time is learnt as the torque point.

Specifically, the control system taught by JP-A-2015-218740 is applied to a hybrid vehicle in which a prime mover includes an engine, a first motor, and a second motor. In the hybrid vehicle to which the control system taught by JP-A-2015-218740 is applied, the clutch is disposed between the engine and a power split mechanism to selectively interrupt power transmission between an output shaft of the engine and a carrier of the power split mechanism. According to the teachings of JP-A-2015-218740, the control system is configured to learn the engagement start position of the clutch during propulsion in a cut-off EV running mode in which the vehicle is powered by the second motor while disengaging the clutch. However, the engagement start position of the clutch will not be learnt unless the vehicle is propelled in the cut-off EV running mode. In order to learn the engagement start position of the clutch more accurately to improve a control response, it is preferable to learn the engagement start position of the clutch more frequently.

On the other hand, according to the teachings of JP-A-2002-286123 and JP-A-2002-286056, the torque point of the wet multiple disc clutch is learnt. In the wet multiple disc clutch, oil is applied to a friction surface of a clutch plate, therefore, drag torque is generated inevitably by agitator torque (i.e., due to shearing resistance). Such drag torque varies depending on temperatures of the oil, the friction surface and so on. That is, accuracy of learning the torque point of the wet multiple disc clutch may be reduced due to variation in the drag torque resulting from a change in temperature. Likewise, although not as significant as the wet multiple disc clutch, accuracy of learning the torque point of a dry clutch to which the oil is not applied may also be reduced due to change in temperature.

Thus, in order to improve accuracy of learning an engagement point or an initial engagement position of the clutch thereby improving a control response, it is necessary to increase opportunity for learning the engagement point or the initial engagement position of the clutch.

SUMMARY

Aspects of embodiments of the present disclosure have been conceived noting the foregoing technical problems, and it is therefore an object of the present disclosure to provide a control system for a vehicle configured to accurately learn an engagement point or an initial engagement position of a clutch by increasing opportunity for learning the engagement point or the initial engagement position of the clutch, so as to improve a control response.

The control system according to the exemplary embodiment of the present disclosure is applied to a vehicle, comprising: a prime mover; at least one pair of drive wheels; a clutch that selectively transmits power between the prime mover and the drive wheels, and that selectively interrupts power transmission between the prime mover and the drive wheels; and a detector that detects an input speed of the clutch rotated by an output torque of the prime mover. In order to achieve the above-explained objective, according to the exemplary embodiment of the present disclosure, the control system is provided with a controller that controls the prime mover and the clutch, and that learns and corrects an initial engagement position of the clutch. Specifically, the controller is configured to: maintain the input speed of the clutch to a constant speed by the output torque of the prime mover; and execute a learning of the initial engagement position of the clutch, if a reaction time until the input speed of the clutch is changed by engaging the clutch gradually while maintaining the input speed of the clutch to the constant speed is shorter than a threshold period of time.

In a non-limiting embodiment, the prime mover may include a motor, and the detector may be configured to detect an input current to the motor. In addition, the controller may be further configured to: maintain the input speed of the clutch to the constant speed by an output torque of the motor; and execute the learning of the initial engagement position of the clutch, if a reaction time until the input current to the motor is changed by engaging the clutch gradually while maintaining the input speed of the clutch to the constant speed is shorter than another threshold period of time.

In a non-limiting embodiment, the prime mover may include an engine, and the clutch may include a wet-type friction clutch that transmits the output torque of the engine to the drive wheels when launching the vehicle.

In a non-limiting embodiment, the vehicle may further comprise an automatic transmission that transmits torque between the prime mover and the drive wheels. In addition, the controller may be further configured to: control the automatic transmission; and execute the learning of the initial engagement position of the clutch while establishing a predetermined gear stage or speed ratio by the automatic transmission.

In a non-limiting embodiment, the automatic transmission may comprise a plurality of friction clutches that are manipulated to establish the predetermined gear stage or speed ratio, and that are disengaged to interrupt torque transmission between the prime mover and the drive wheels; and the clutch may include any one of the plurality of friction clutches of the automatic transmission.

In a non-limiting embodiment, the prime mover may include an engine and a first motor that is connected to the engine in a power transmittable manner, and the vehicle may further comprise a second motor that is connected to the drive wheels in a power transmittable manner to serve as another prime mover. In addition, the controller may be further configured to execute the learning of the initial engagement position of the clutch while generating a drive torque by the second motor and driving the first motor as a generator by the engine.

In a non-limiting embodiment, the prime mover may include an engine and a first motor that is connected to the engine in a power transmittable manner, and the vehicle may further comprise a second motor that is connected to the drive wheels in a power transmittable manner to serve as another prime mover. In addition, the controller may be further configured to execute the learning of the initial engagement position of the clutch while generating a drive torque by the second motor and cranking the engine by the first motor.

Thus, according to the exemplary embodiment of the present disclosure, the clutch is engaged gradually while maintaining the input speed to the clutch to the constant speed by the output torque of the prime mover, when the prime mover is operated in a stable manner. The controller is configured to execute the learning or correction of the initial engagement position of the clutch, if a reaction time until the input speed of the clutch is changed by engaging the clutch gradually while maintaining the input speed of the clutch to the constant speed is reduced shorter than the threshold period of time. According to the exemplary embodiment of the present disclosure, therefore, the initial engagement position of the clutch may be learnt every time the input speed of the clutch is maintained to the constant speed. For this reason, opportunities for learning the initial engagement position of the clutch may be increased to learn the initial engagement point of the clutch accurately. In addition, since the learning of the initial engagement position of the clutch is executed only when the above-mentioned reaction time is shorter than the threshold period of time, the initial engagement position of the clutch may be learnt accurately without being influenced by a temperature and variation in detection data. According to the exemplary embodiment of the present disclosure, therefore, the initial engagement point of the clutch may be learnt accurately to improve a control response.

For example, the input speed of the clutch may be maintained to the constant speed by the output torque of the motor. In this case, the learning of the initial engagement position of the clutch is executed if the reaction time until the input current to the motor is changed by engaging the clutch gradually while maintaining the input speed of the clutch to the constant speed is reduced shorter than the threshold period of time. According to the exemplary embodiment of the present disclosure, therefore, the initial engagement point of the clutch may be learnt accurately by detecting the input current to the motor.

According to the exemplary embodiment of the present disclosure, the initial engagement position of the wet-type friction clutch serving as a starting clutch to launch the vehicle may also be learnt. In the wet-type friction clutch, a drag torque is generated inevitably by a steering resistance of oil. Since the drag torque is changed depending on the temperature, it is difficult to accurately learn the initial engagement position of the wet-type friction clutch, compared to a dry-type clutch. In addition, a frequency in use of the starting clutch is higher than that of the other clutches in a powertrain, and a frictional workload of the starting clutch when engaged is large. Therefore, it is advantageous to learn the initial engagement position of the starting clutch.

According to the exemplary embodiment of the present disclosure, the initial engagement position of the clutch may be learnt accurately while establishing a predetermined gear stage in the automatic transmission and maintaining the input speed of the clutch to the constant speed.

According to the exemplary embodiment of the present disclosure, the initial engagement position of the friction clutch arranged in the automatic transmission may be learnt accurately.

According to the exemplary embodiment of the present disclosure, the initial engagement position of the clutch may be learnt during propulsion in a series-hybrid mode of a hybrid vehicle in which the first motor is driven as a generator by the output torque of the engine, and the vehicle is propelled by the output torque of the second motor. According to the exemplary embodiment of the present disclosure, therefore, the initial engagement position of the clutch arranged in the hybrid vehicle may be learnt accurately.

According to the exemplary embodiment of the present disclosure, the initial engagement position of the clutch may also be learnt during propulsion in an electric power consuming mode in which the second motor is driven as a generator by a torque delivered thereto from the drive wheels, and the engine is cranked by the first motor. According to the exemplary embodiment of the present disclosure, therefore, the initial engagement position of the clutch may be learnt frequently in variety of operating mode of the hybrid vehicle.

BRIEF DESCRIPTION OF THE DRAWINGS

Features, aspects, and advantages of exemplary embodiments of the present disclosure will become better understood with reference to the following description and accompanying drawings, which should not limit the disclosure in any way.

DETAILED DESCRIPTION OF THE PREFERRED EMBODIMENT(S)

Preferred embodiments of the present disclosure will now be explained with reference to the accompanying drawings.

The control system according to the embodiment of the present disclose is applied to a vehicle having a clutch that selectively interrupt power transmission between a prime mover and a pair of drive wheels. For example, the control system according to the embodiment of the present disclose may be applied to a vehicle in which only an internal combustion engine serves as a prime mover, a hybrid vehicle in which a prime mover includes an internal combustion engine and at lease one motor, and an electric vehicle in which only a motor serves as a prime mover.

Figure 1:
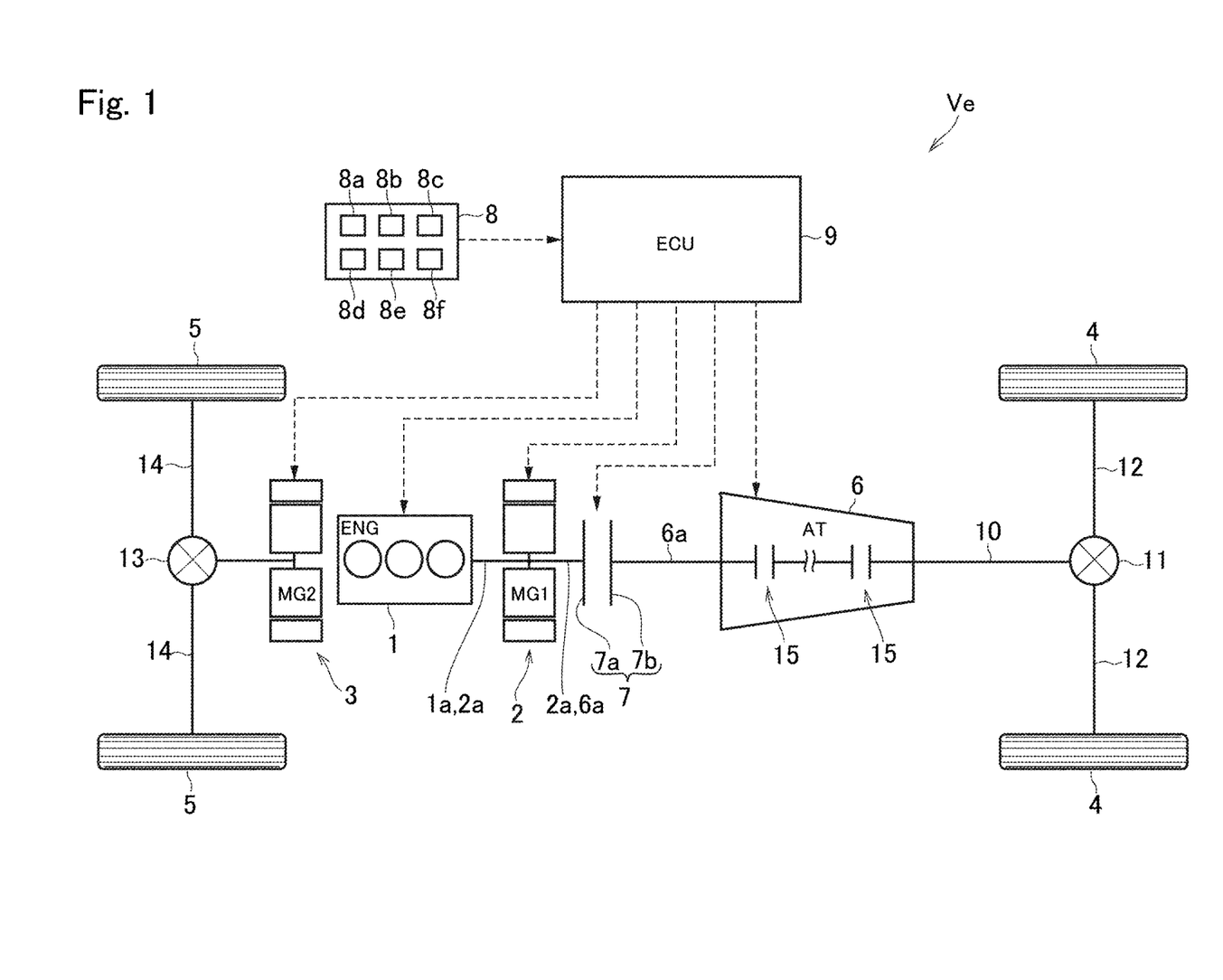
FIG. 1 is a schematic illustration showing a first example of a structure of the vehicle to which the control system according to the embodiment of the present disclosure is applied.

Referring now to FIG. 1, there is shown a first example of a drive system and a control system of a vehicle Ve to which the control system according to the embodiment of the present disclosure is applied. A prime mover of the vehicle Ve includes an engine 1 (referred to as "ENG" in the drawings), a first motor (referred to as "MG1" in the drawings) 2, and a second motor (referred to as "MG2" in the drawings) 3. That is, the vehicle Ve shown in FIG. 1 is a two-motor type hybrid vehicle. The vehicle Ve shown in FIG. 1 comprises a pair of rear wheels 4, a pair of front wheels 5, an automatic transmission (referred to as "AT" in the drawings) 6, a starting clutch 7, a detector 8, and a controller (referred to as "ECU" in the drawings) 9.

For example, an internal combustion engine such as a gasoline engine and a diesel engine may be adopted as the engine 1. An output power of the engine 1 may be adjusted electrically, and the engine 1 may be started and stopped electrically according to need. For example, given that the gasoline engine is adopted as the engine 1, an opening degree of a throttle valve, an amount of fuel supply or fuel injection, a commencement and a termination of ignition, an ignition timing etc. may be controlled electrically. Otherwise, given that the diesel engine is used as the engine 1, an amount of fuel injection, an injection timing, an opening degree of a throttle valve of an Exhaust Gas Recirculation (EGR) system etc. may be controlled electrically.

The first motor 2 is disposed coaxially with the engine 1, and in the example shown in FIG. 1, a rotor shaft 2*a* of the first motor 2 is connected to an output shaft 1*a* of the engine 1 through a damper device (not shown). The first motor 2 serves not only as a motor to generate torque when driven by electricity suppled thereto, but also as a generator to generate electricity when driven by torque of the engine 1. That is, the first motor 2 is a motor-generator. For example, a permanent magnet type synchronous motor, and an induction motor may be adopted as the first motor 2. The first motor 2 is also connected to a battery through an inverter (neither of which are shown) so that the electricity generated by the first motor 2 can be accumulated in the battery. The first motor 2 may be operated as a motor to generate torque by supplying the electricity to the first motor 2 from the battery.

The second motor 3 is connected to the front wheels 5 in a power transmittable manner. The second motor 3 serves not only as a motor to generate torque when driven by electricity suppled thereto, but also as a generator to generate electricity when driven by torque applied thereto from an external source. Thus, the second motor 3 is also a motor-generator. For example, a permanent magnet type synchronous motor, and an induction motor may also be adopted as the second motor 3. The second motor 3 is also connected to the battery through the inverter. Specifically, the second motor 3 may be operated as a motor to generate torque by supplying electricity to the second motor 3 from the battery, and may also be driven as a generator by torque transmitted thereto from the front wheels 5. The electricity generated by the second motor 3 may be accumulated in the battery. The first motor 2 and the second motor 3 are connected to each other through the inverter so that the electricity is exchanged therebetween. For example, the second motor 3 may also be allowed to generate torque by directly supplying electricity generated by the first motor 2.

Figure 2:
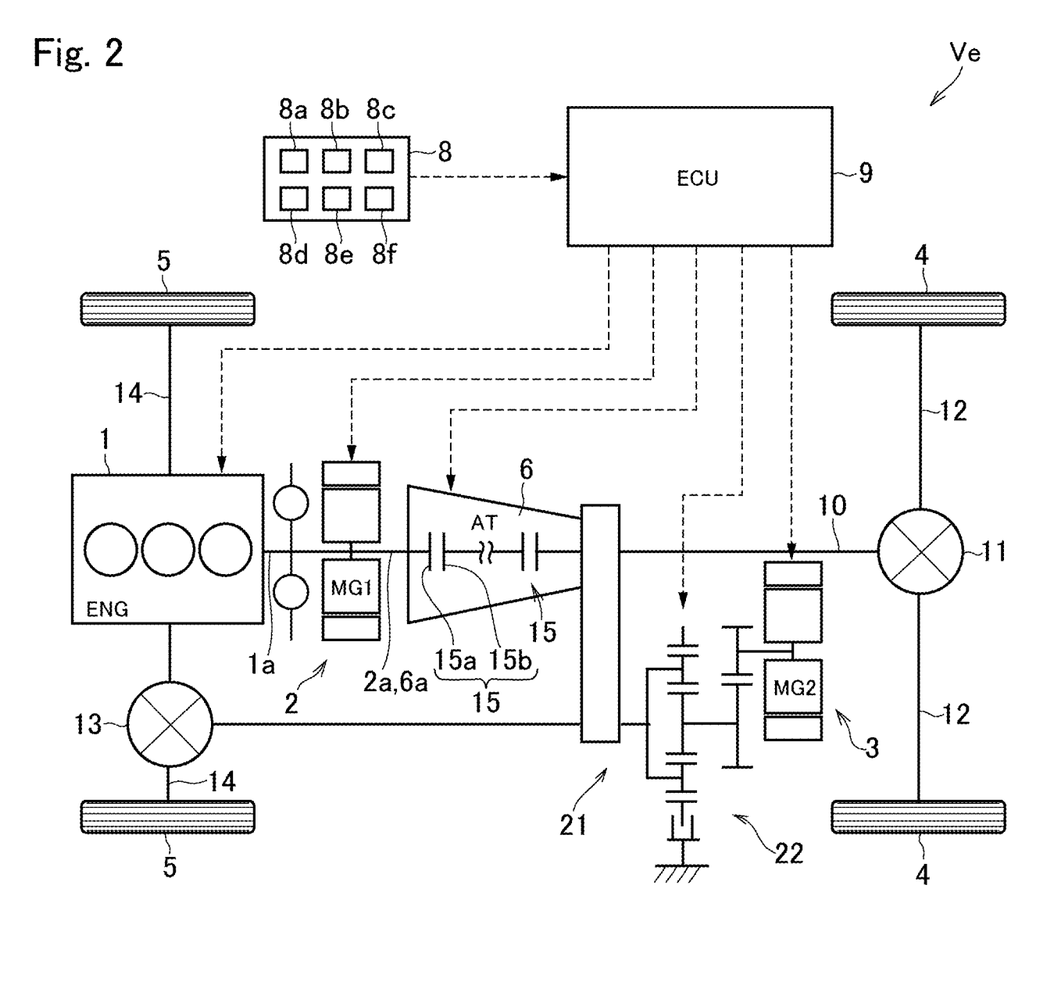
FIG. 2 is a schematic illustration showing a second example of a structure of the vehicle to which the control system according to the embodiment of the present disclosure is applied.

Turing to FIG. 2, there is shown the second example of the vehicle Ve to which the control system according to the exemplary embodiment of the present disclosure is applied. The vehicle Ve shown in FIG. 2 is a four-wheel drive layout vehicle in which the second motor 3 is connected to a power transmission route including a transfer 21 through a speed reducing mechanism 22. In the vehicle Ve shown in FIG. 2, the transmission (as will be simply called the "transmission" hereinafter) 6 is disposed downstream of the first motor 2, and a friction clutch 15 is arranged in the transmission 6 to serve as a launching device instead of a torque converter. In a case of applying the control system according to the exemplary embodiment of the present disclosure to the vehicle Ve shown in FIG. 2, the control system learns an initial engagement position of the friction clutch 15 arranged in the transmission 6. In FIG. 2 and below-explained FIGS. 3 and 4, common reference numerals are allotted to the elements in common with those shown in FIG. 1.

Figure 3:
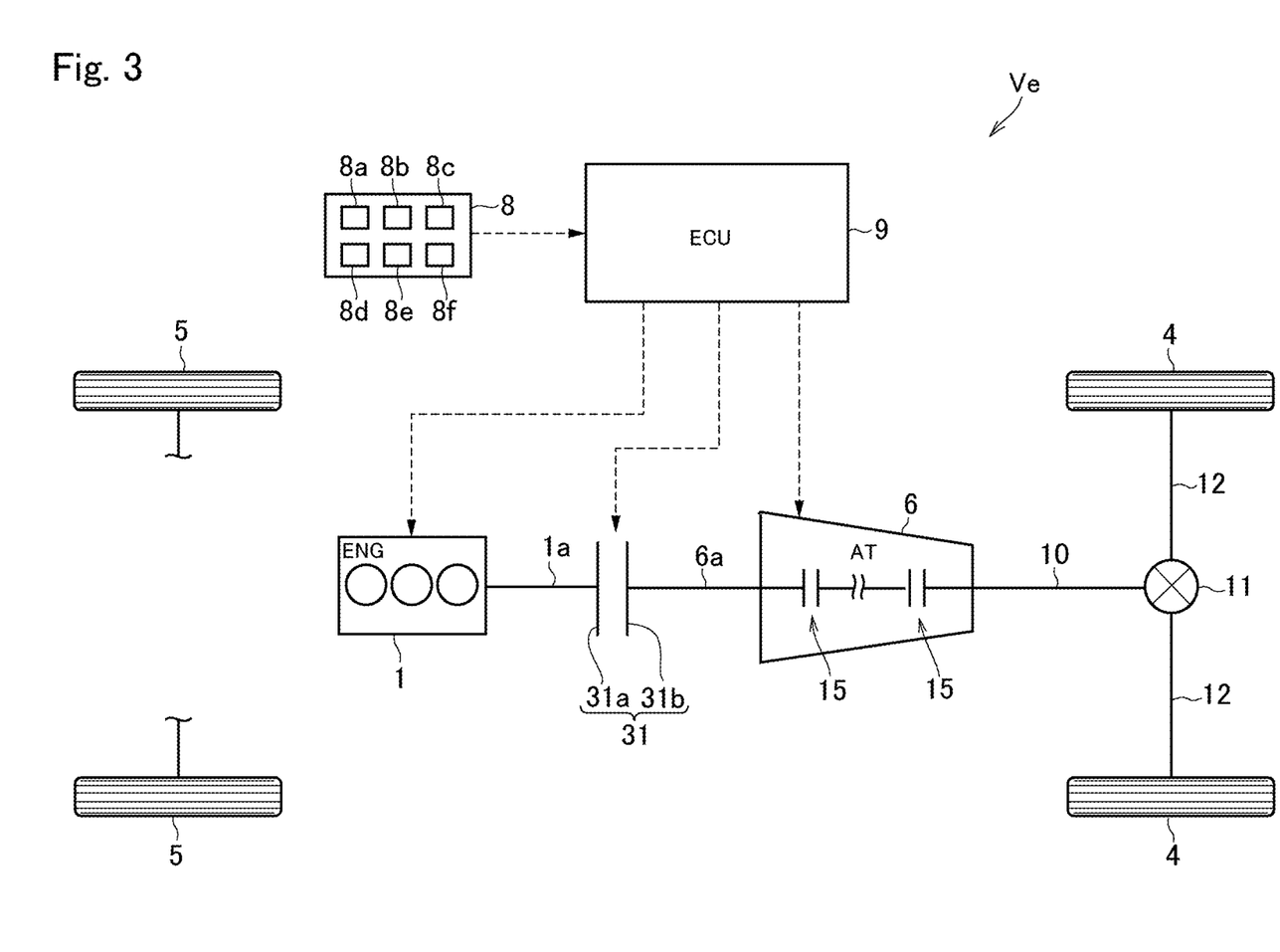
FIG. 3 is a schematic illustration showing a third example of a structure of the vehicle to which the control system according to the embodiment of the present disclosure is applied.

Turing to FIG. 3, there is shown the third example of the vehicle Ve to which the control system according to the exemplary embodiment of the present disclosure is applied. In the vehicle Ve shown in FIG. 3, only the engine 1 serves as a prime mover, and a starting clutch 31 is disposed between the engine 1 and the transmission 6 to serve as a launching device instead of a torque converter. That is, the starting clutch 31 selectively transmits power between the engine 1 and the rear wheels 4, and selectively interrupts power transmission between the engine 1 and the rear wheels 4. The starting clutch 31 comprises an input element 31*a* connected to the output shaft 1*a* of the engine 1, and an output element 31*b* connected to an input shaft 6*a* of the transmission 6. In the starting clutch 31, the input element 31*a* and the output element 31*b* are frictionally engaged to each other to transmits power. In a case of applying the control system according to the exemplary embodiment of the present disclosure to the vehicle Ve shown in FIG. 3, the control system learns an initial engagement position of the starting clutch 31.

Figure 4:
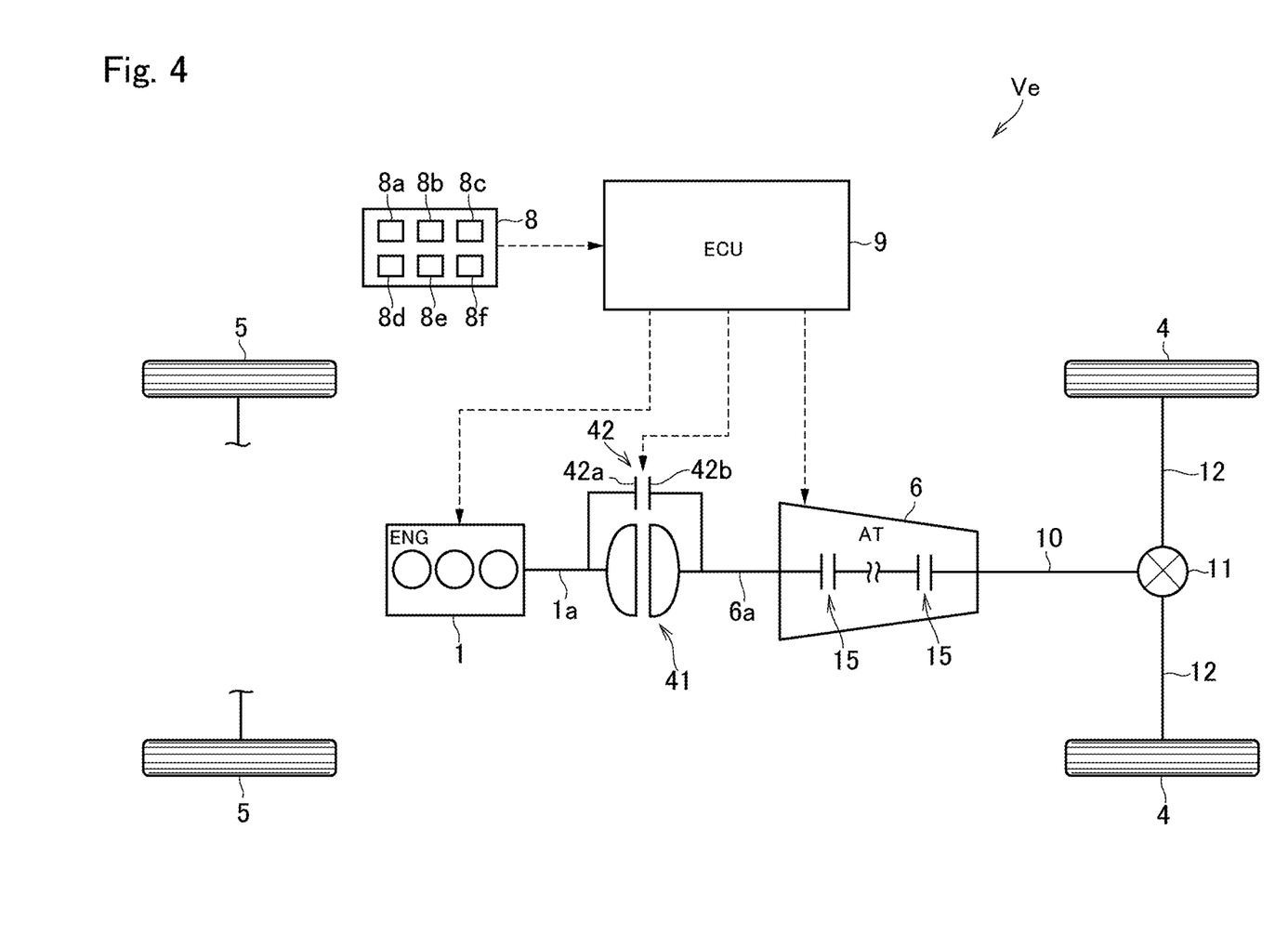
FIG. 4 is a schematic illustration showing a fourth example of a structure of the vehicle to which the control system according to the embodiment of the present disclosure is applied.

Turing to FIG. 4, there is shown the fourth example of the vehicle Ve to which the control system according to the exemplary embodiment of the present disclosure is applied. In the vehicle Ve shown in FIG. 4, only the engine 1 serves as a prime mover, and a torque converter 41 having a lockup clutch 42 is disposed downstream of the engine 1. The lockup clutch 42 comprises an input element 42a connected to a rotary member (not shown) of the engine 1 side, and an output element 42b connected to a rotary member (not shown) of the rear wheels 4 side. In a case of applying the control system according to the exemplary embodiment of the present disclosure to the vehicle Ve shown in FIG. 4, the control system learns an initial engagement position of the lockup clutch 42.

Turning back to FIG. 1, in the vehicle Ve shown in FIG. 1, the rear wheels 4 are driven by drive torque of the prime mover to generate a drive force to propel the vehicle Ve. To this end, in the vehicle Ve shown in FIG. 1, the rear wheels 4 are connected to the prime mover including the engine 1 and the first motor 2 through the starting clutch 7, the transmission 6, a rear propeller shaft 10, a rear differential gear unit 11, and rear driveshafts 12.

The vehicle Ve shown in FIG. 1 is a four-wheel drive layout (i.e., an all-wheel drive layout) vehicle in which the drive torque is delivered to both pairs of the front wheels 5 and the rear wheels 4 to propel the vehicle Ve. That is, the front wheels 5 are also driven by the drive torque generated by the prime mover. To this end, in the vehicle Ve shown in FIG. 1, the front wheels 5 are connected to the second motor 3 serving as another prime mover through a front differential gear unit 13, and front driveshafts 14.

The transmission 6 is disposed on an output side of the first motor 2 to transmit torques of the engine 1 and the first motor 2 to the rear wheels 4. The transmission 6 is adapted to change a ratio of a speed of an input shaft to a speed of an output shaft arbitrarily. For example, an automatic transmission such as a geared transmission and a continuously variable transmission may be adopted as the transmission 6. The transmission 6 is provided with a plurality of the friction clutches 15 so that a predetermined gear stage or speed ratio is established by manipulating the friction clutches 15, and the transmission 6 is brought into a neutral stage by disengaging the friction clutches 15. As shown FIG. 2, the friction clutch 15 employed in the vehicles Ve shown in FIGS. 1 and 2 comprises an input element 15a connected to a rotary member (not shown) of the engine 1 or the first motor 2, and an output element 15b connected to a rotary member (not shown) of the rear wheel 4 side. In a case of applying the control system according to the exemplary embodiment of the present disclosure to the vehicle Ve shown in FIG. 1 or 2, the control system learns an initial engagement position of the friction clutch 15 of the transmission 6.

Although not especially shown in FIGS. 1 and 2, a multiple plate clutch comprising a plurality of the input elements 15a and a plurality of the output elements 15b arranged alternately may be adopted as the friction clutch 15. Specifically, power transmission between the engine 1 or the first motor 2 and the rear wheels 4 is interrupted by any one of the friction clutches 15. By contrast, a predetermined gear stage is established in the transmission 6 by engaging at least any two of the friction clutches 15 to transmit power between the engine 1 or the first motor 2 and the rear wheels 4.

In the vehicle Ve shown in FIG. 1, the starting clutch 7 is disposed between the first motor 2 and the transmission 6 to selectively transmit power between the prime mover (i.e., the engine 1 and the first motor 2) and the rear wheels 4, and to selectively interrupt power transmission between the prime mover and the rear wheels 4. The starting clutch 7 comprises an input element 7a and an output element 7b, and the starting clutch 7 is engaged by frictionally mating the input element 7a and the output element 7b to each other. Specifically, the input element 7a is connected to the output shaft 1a of the engine 1 through the rotor shaft 2a of the first motor 2, and the output element 7b is connected to an input shaft 6a of the transmission 6. That is, the engine 1 and the first motor 2 are disconnected from a powertrain to deliver the drive torque to the rear wheels 4 by disengaging the input element 7a and the output element 7b of the starting clutch 7 from each other. By contrast, the engine 1 and the first motor 2 are connected to the powertrain to deliver the drive torque to the rear wheels 4 by engaging the input element 7a and the output element 7b of the starting clutch 7 to each other.

Although not especially shown in FIG. 1, a wet-type multiple plate clutch comprising a plurality of the input elements 7a and a plurality of the output elements 7b arranged alternately may also be adopted as the clutch 7. That is, a friction clutch whose torque transmitting capacity can be varied continuously may be adopted as the starting clutch 7. In the vehicle Ve shown in FIG. 1, therefore, an output torque of the engine 1 may be delivered smoothly to the rear wheels 4 to launch the vehicle Ve by engaging the starting clutch 7 in such a manner as to vary the torque transmitting capacity continuously. The control system according to the exemplary embodiment may also learn the initial engagement position of a wet-type single plate clutch or a dry-type clutch. However, advantages to be achieved by learning the initial engagement position of the wet-type clutch is more significant than that achieved by learning the initial engagement position of the dry-type clutch.

As described, in the vehicle Ve shown in FIG. 1, the engine 1 is connected to the first motor 2 in a power transmittable manner. That is, it is also possible to launch the vehicle Ve shown in FIG. 1 smoothly by the output torque of the engine 1 without using the clutch 7. For example, the output torque of the engine 1 may be delivered smoothly to the rear wheels 4 by controlling the output torque of the engine 1 by the first motor 2. However, when propelling the vehicle Ve at a very low speed e.g., at 1 km to 3 km per hour, the rear wheels 4 may be rotated at a speed different from an idling speed of the engine 1. In this situation, the output torque of the engine 1 may be delivered smoothly to the rear wheels 4 by absorbing such speed difference by the starting clutch 7.

The detector 8 includes sensors, devices and so on to collect various data and information relating to the vehicle Ve. For example, the detector 8 collects at least data necessary to learn and correct the initial engagement position of the starting clutch 7. To this end, the detector 8 comprises a clutch speed sensor 8a that detects a speed of the input element 7a of the starting clutch 7 (i.e., an input speed of the starting clutch 7), an engine speed sensor 8b that detects a speed of the engine 1, a motor speed sensor 8c (or a resolver) that detects a speed of the first motor 2, a motor current sensor 8d that detects an input current to the first motor 2, a clutch pressure sensor 8e that detects a hydraulic pressure to actuate the starting clutch 7, and an AT pressure sensor 8f that detects a hydraulic pressure to actuate the friction clutch 15. In the case of applying the control system according to the exemplary embodiment of the present disclosure to the vehicle Ve shown in FIG. 4, the detector 8 further comprises a lockup pressure sensor (not shown) that detects a hydraulic pressure to actuate the lockup clutch 42 of the torque converter 41. The detector 8 is electrically connected to the controller 9 so that the data collected by the detector 8 is transmitted to the controller 9 in the form of electric signal.

The controller 9 comprises a microcomputer as its main constituent, and for example, the engine 1, the first motor 2, the second motor 3, the clutch 7, and the starting clutch 7 are controlled by the controller 9. The controller 9 performs calculation using the incident data transmitted from the detector 8, and data and formulas or the like stored in advance. Calculation results are transmitted from the controller 9 to the engine 1, the first motor 2, the second motor 3, the starting clutch 7 and so on in the form of command signal. Although only one controller 10 is depicted in the drawings, a plurality of controllers may be arranged in the vehicle Ve to control the specific devices individually.

As described, the control system according to the exemplary embodiment of the present disclosure is configured to learn the initial engagement position of the above-mentioned starting clutch 7, the friction clutch 15, the starting clutch 31, and the lockup clutch 42, for the purpose of improving a control response. To this end, the controller 9 executes routines shown in FIGS. 5 and 6.

Figure 5:
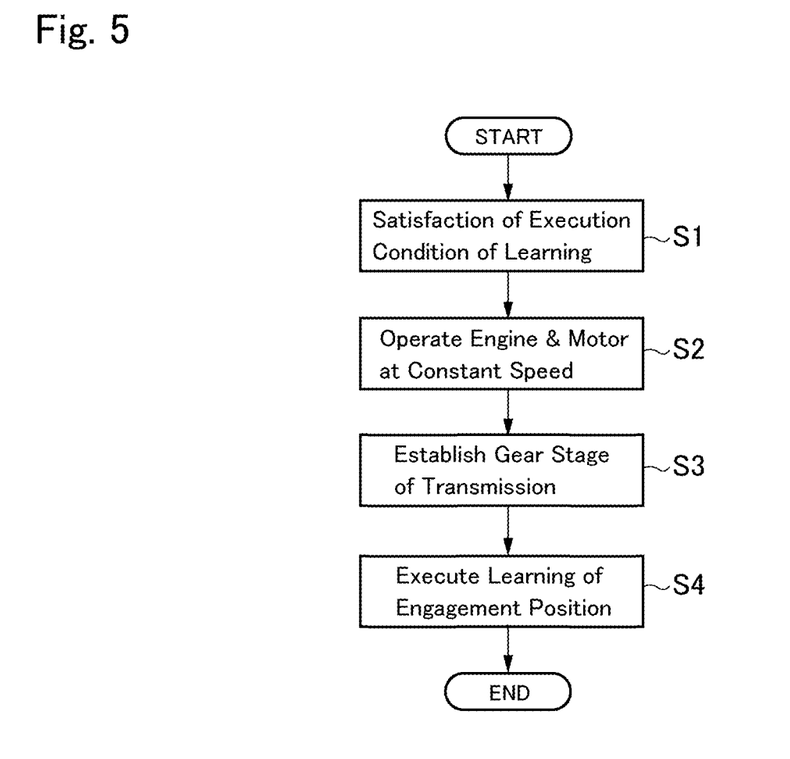
FIG. 5 is a flowchart showing one example of a basic routine to learn the initial engagement position of the clutch.

Turning to FIG. 5, there is shown the preliminary routine to execute the learning of the initial engagement position of the above-mentioned clutches 7, 15, 31 or 42. As shown at step S1, the learning of the initial engagement position of the clutch is commences upon satisfaction of a predetermined execution condition. For example, the execution condition is satisfied: (1) if the vehicle Ve is propelled in a series-hybrid mode, if the vehicle Ve is in an electric power consuming mode, if the vehicle Ve is propelled at a constant speed under a constant load, or if the engine 1 idles; and (2) an integrated value of a frictional workload of the clutch from a completion of a previous learning of the initial engagement position of the clutch is greater than a predetermined value, or a travel distance from the completion of the previous learning of the initial engagement position of the clutch is longer than a predetermined distance.

The series-hybrid mode is available in the vehicles Ve shown in FIGS. 1 and 2. In the series-hybrid mode, the first motor 2 is driven as a generator by the output torque of the engine 1, and the vehicle Ve is propelled by an output torque of the second motor 3. The electric power consuming mode is selected if the battery is fully charged when regenerating electric power by the second motor 3 during deceleration of the vehicle Ve. In the electric power consuming mode, the electric power is consumed compulsory by motoring the engine 1 by the first motor 2 so as to prevent an overcharging of the battery. That is, the execution condition is satisfied when the engine 1 or the first motor 2 is operated at a constant speed e.g., when propelling the vehicle Ve at a constant speed, and when idling the engine.

Specifically, the frictional workload of the clutch is an amount of frictional load applied to the clutch when engaging the clutch 7, 31, or 15 while slipping. For example, an integrated value of the frictional workload of the clutch may be calculated by temporally integrating a product of: a clutch torque estimated based on a hydraulic pressure applied to the clutch; and a speed difference between the input element and the output element during a slip engagement of the clutch. According to the exemplary embodiment of the present disclosure, the execution condition to execute the learning of the initial engagement position of the clutch is satisfied when the integrated value of the frictional workload of the clutch from the completion of the previous learning exceeds the predetermined value, or the travel distance from the completion of the previous learning exceeds the predetermined distance. According to the exemplary embodiment of the present disclosure, therefore, the learning of the initial engagement position of the clutch will not be executed too frequently.

At step S2, the engine 1 and the first motor 2 are driven at a constant speed respectively. For example, in the series-hybrid mode, the output torque of the engine 1 is maintained to a constant torque, and a speed of the first motor 2 is maintained to a constant speed. Otherwise, in the electric power consuming mode, a fuel cut-off control of the engine 1 is executed, and a speed of the first motor 2 is maintained to a constant speed. In the case that the control system is applied to the vehicle Ve shown in FIG. 3 or 4, a speed of the engine 1 is maintained to a constant speed.

At step S3, a predetermined gear stage is established by the transmission 6. Given that a continuously variable transmission is adopted as the transmission 6, a speed ratio of the transmission 6 is maintained to a constant ratio. In this situation, specifically, the gear stage or the speed ratio of the transmission 6 is selected in such a manner as to adjust an input speed of the clutch 7, 15, or 31 toward the rotational speed to the engine 1 or the first motor 2, so as to ensure an acceleration response and to reduce an engagement shock after engaging the clutch 7, 15, or 31. However, the gear stage or the speed ratio of the transmission 6 is selected in such a manner that the input speed to the clutch 7, 15, or 31 will not be synchronized to the rotational speed to the engine 1 or the first motor 2.

Figure 6:
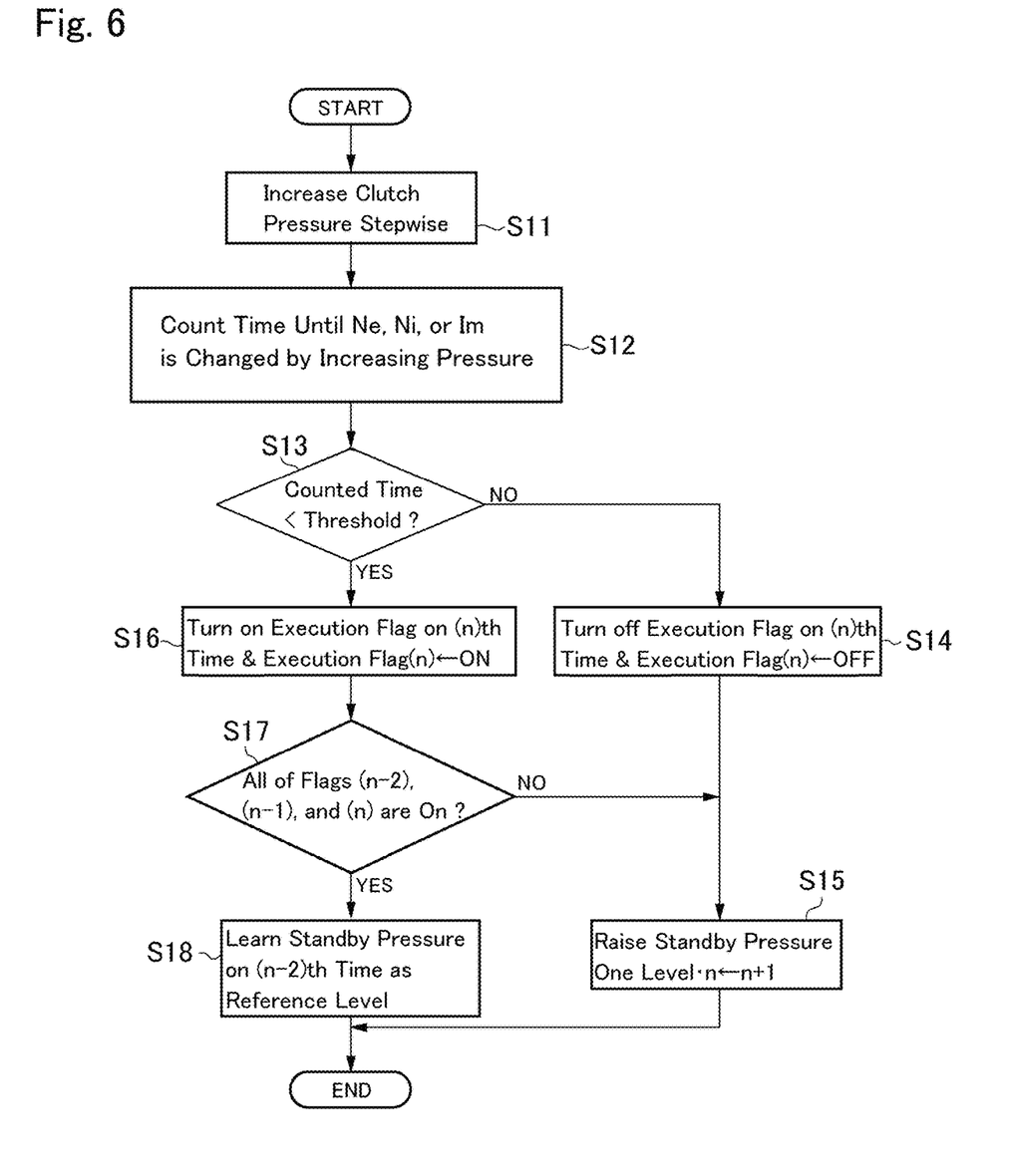
FIG. 6 is a flowchart showing one example of a routine to learn the initial engagement position of the clutch while engaging the clutch gradually and stepwise.

At step S4, the learning of the initial engagement position of the clutch is executed. To this end, according to the exemplary embodiment of the present disclosure, the input speed of the clutch 7, 15, or 31 is maintained to a constant speed by the output torque of the engine 1 or the first motor 2. The learning and the correction of the initial engagement position of the clutch 7, 15, or 31 is executed if a reaction time until the input speed of the clutch 7, 15, or 31 starts changing as a result of gradually engaging the clutch 7, 15, or 31 while maintaining the input speed is shorter than a threshold period of time. Procedures to learn the initial engagement position of the clutch are shown in FIG. 6 in more detail.

Figure 7:
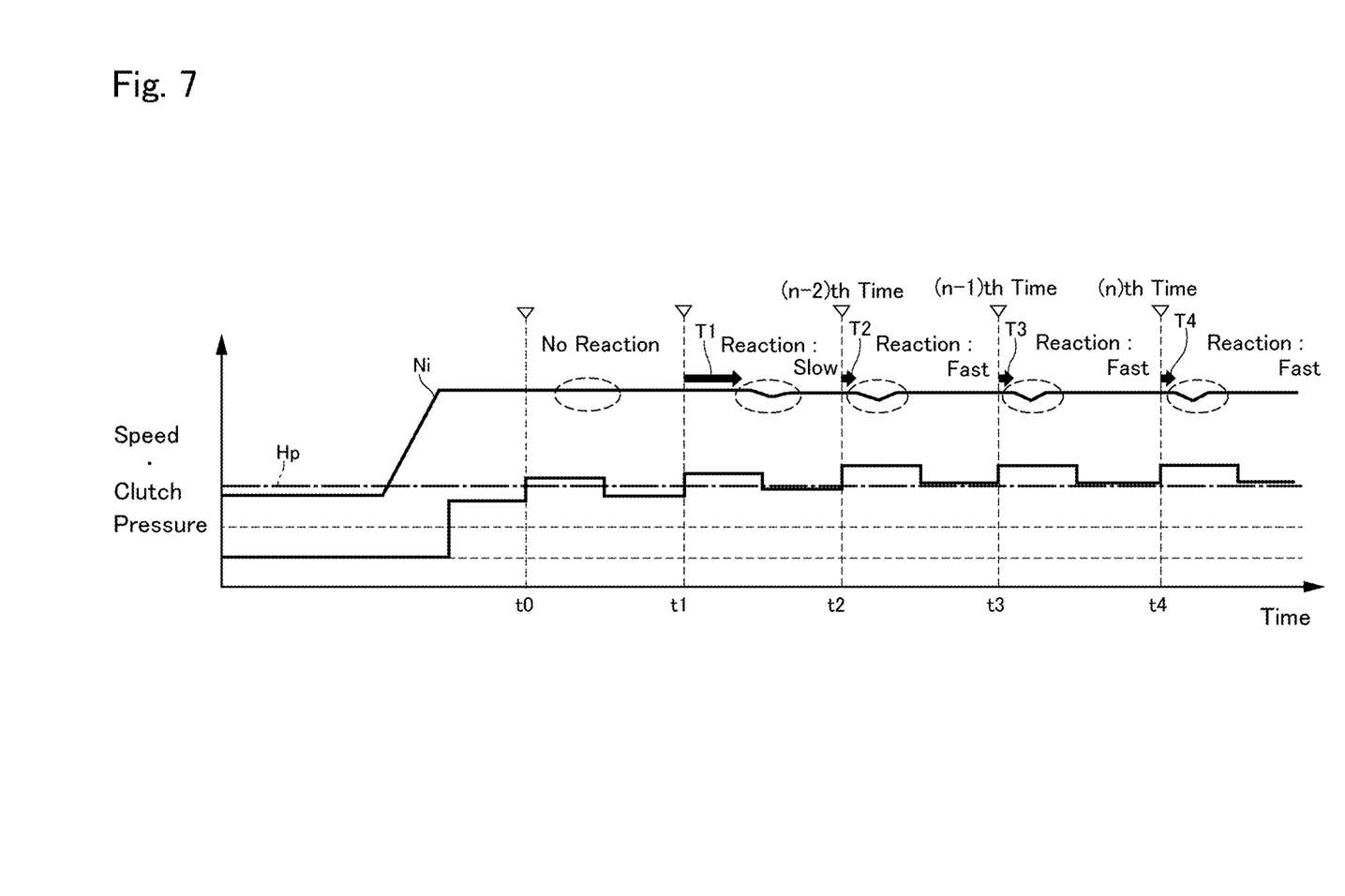
FIG. 7 is a time chart showing a temporal change in the input speed of the clutch when engaging the clutch gradually.

At step S11, a hydraulic pressure applied to the clutch 7, 15, or 31 is increased gradually little by little to engage the clutch 7, 15, or 31 gradually. Procedures to increase the hydraulic pressure applied to the clutch 7, 15, or 31 is indicated in FIG. 7 in more detail. In this situation, the clutch 7, 15, or 31 whose initial engagement position is to be learnt is disengaged completely. That is, before point t0, the hydraulic pressure applied to the clutch 7, 15, or 31 is lower than a currently stored packing pressure Hp to reduce a clearance in a clutch pack of the clutch 7, 15, or 31 in advance. As indicated in FIG. 7, the hydraulic pressure applied to the clutch 7, 15, or 31 is increased temporarily at each point t0, t1, t2, t3, and t4 and reduced after the lapse of predetermined period of time. Specifically, the hydraulic pressure applied to the clutch 7, 15, or 31 is increased temporarily at a predetermined time point shown in FIG. 7 and reduced after the lapse of the predetermined period of time, and then increased at the next time point to a slightly higher level than a highest level at the previous time point. Consequently, the hydraulic pressure applied to the clutch 7, 15, or 31 is increased gradually little by little to engage the clutch 7, 15, or 31 gradually.

Then, at step S12, a reaction time until the input speed Ni of the clutch 7, 15, or 31 is changed by increasing the hydraulic pressure applied to the clutch 7, 15, or 31 temporarily stepwise is calculated. In other words, at step S12, a reaction time until the input speed Ni of the clutch 7, 15, or 31 is changed by gradually engaging the clutch 7, 15, or 31 is calculated. In FIG. 7, the reaction time until the input speed Ni of the clutch 7, 15, or 31 is changed by increasing the hydraulic pressure applied to the clutch 7, 15, or 31 at each point t1, t2, t3, and t4 is indicated as the arrows T1, T2, T3, and T4, respectively.

According to the example shown in FIG. 7, a period of time to a point at which the input speed Ni of the clutch 7, 15, or 31 is changed greater than a predetermined value is counted as the reaction time. When the clutch 7, 15, or 31 is engaged by increasing the hydraulic pressure applied to the clutch 7, 15, or 31 stepwise, a transmission torque of the clutch 7, 15, or 31 is increased, and a load applied to the engine 1 or the first motor 2 is increased. Consequently, the input speed Ni of the clutch 7, 15, or 31 being maintained to the constant speed by the output torque of the engine 1 or the first motor 2 is reduced. Therefore, the reaction time until the input speed Ni of the clutch 7, 15, or 31 is changed by increasing the hydraulic pressure applied to the clutch 7, 15, or 31 stepwise may be obtained by counting the period of time to a point at which the input speed Ni of the clutch 7, 15, or 31 is reduced.

Figure 8:
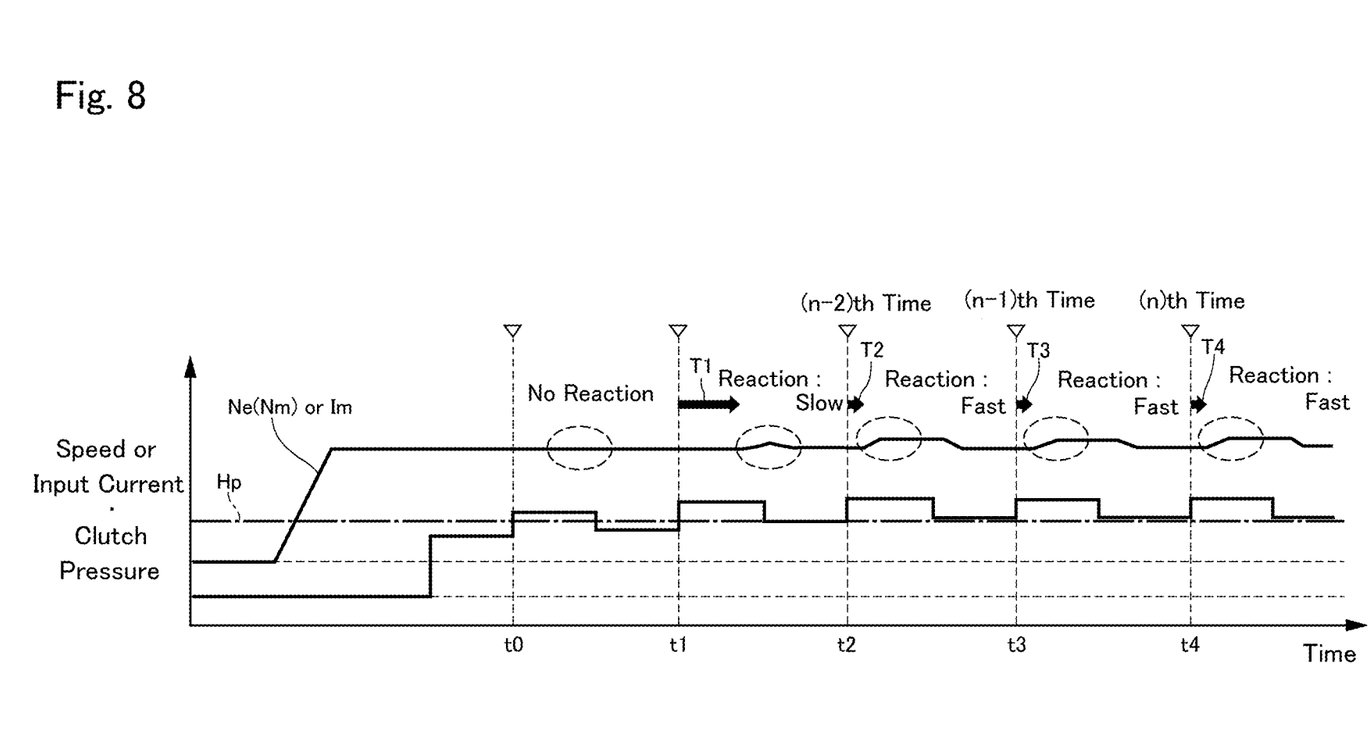
FIG. 8 is a time chart a time chart showing a temporal change in the speed of the engine or the motor, or the input current to the motor when engaging the clutch gradually.

As shown in in FIG. 8, the reaction time until the input speed Ni of the clutch 7, 15, or 31 is changed by increasing the hydraulic pressure applied to the clutch 7, 15, or 31 stepwise may also be obtained based on a speed Ne of the engine 1 or a speed Nm of the first motor 2, instead of the input speed Ni of the clutch 7, 15, or 31. In this case, a period of time to a point at which the speed Ne of the engine 1 or the speed Nm of the first motor 2 is changed greater than a predetermined value is counted as the reaction time. For example, when the clutch 7, 15, or 31 is engaged by increasing the hydraulic pressure applied to the clutch 7, 15, or 31 stepwise while motoring the engine 1 by the first motor 2 in the electric power consuming mode, torque is delivered to the engine 1 or the first motor 2 from the wheels 4 or 5. Consequently, the speed Ne of the engine 1 or the speed Nm of the first motor 2 being maintained to a constant speed to crank the engine 1 is increased by the torque delivered thereto from the wheels 4 or 5. Therefore, the reaction time until the input speed Ni of the clutch 7, 15, or 31 is changed by increasing the hydraulic pressure applied to the clutch 7, 15, or 31 stepwise may be obtained by counting the period of time to a point at which the speed Ne of the engine 1 or the speed Nm of the first motor 2 is increased.

Instead, the reaction time until the input speed Ni of the clutch 7, 15, or 31 is changed by increasing the hydraulic pressure applied to the clutch 7, 15, or 31 stepwise may also be obtained based on an input current Im to the first motor 2 indicated by the common line with the speed Ne of the engine 1 or the speed Nm of the first motor 2 in FIG. 8. In this case, a period of time to a point at which the input current Im to the first motor 2 is changed greater than a predetermined value is counted as the reaction time. As described, when the clutch 7, 15, or 31 is engaged by increasing the hydraulic pressure applied to the clutch 7, 15, or 31 stepwise, the transmission torque of the clutch 7, 15, or 31 is increased, and the load applied to the engine 1 or the first motor 2 is increased. Consequently, the input current Im to the first motor 2 being maintained to a constant value to maintain the input speed Ni of the clutch 7, 15, or 31 to a constant speed is increased. Therefore, the reaction time until the input speed Ni of the clutch 7, 15, or 31 is changed by increasing the hydraulic pressure applied to the clutch 7, 15, or 31 stepwise may be obtained by counting the period of time to a point at which the input current Im to the first motor 2 is increased.

Figure 9:
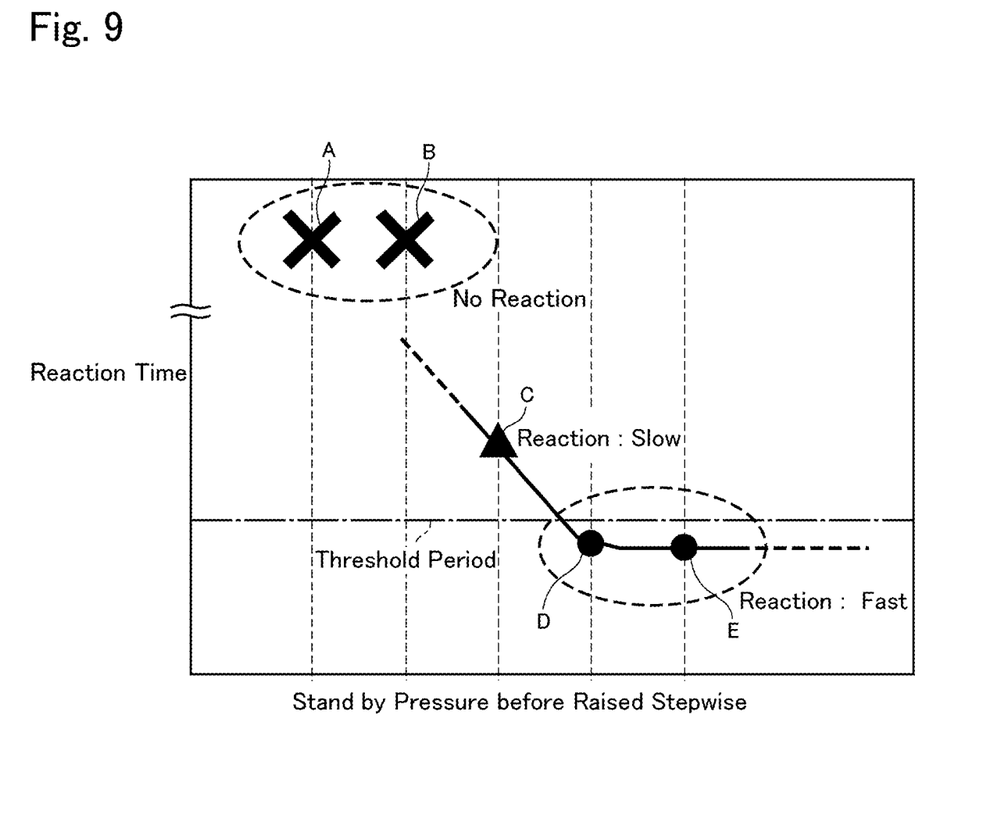
FIG. 9 is a graph indicating a response time of the clutch detected by executing the routine shown in FIG. 6.

Turning back to FIG. 6, at step S13, it is determined whether the counted period of time, that is, the reaction time calculated at step S12 is shorter than a threshold period of time to execute the learning of the initial engagement position of the clutch 7, 15, or 31. As shown in FIG. 9, each of the reaction times counted from the points at which the hydraulic pressure applied to the clutch 7, 15, or 31 is increased stepwise is individually compared to the threshold period of time. If the reaction time is shorter than the threshold period of time, the control system determines that a response of the clutch 7, 15, or 31 is good, and that the clearance in the clutch pack of the clutch 7, 15, or 31 is reduced to start engaging the clutch 7, 15, or 31.

If the reaction time is still longer than the threshold period of time so that the answer of step S13 is NO, the routine progresses to step S14 to turn off a learning execution flag (n).

Specifically, the learning execution flag (n) is turned on if the reaction time until the input speed Ni of the clutch 7, 15, or 31 is changed by increasing the hydraulic pressure applied to the clutch 7, 15, or 31 stepwise is shorter than the threshold period of time, and turned off if the reaction time until the input speed Ni of the clutch 7, 15, or 31 is changed by increasing the hydraulic pressure applied to the clutch 7, 15, or 31 stepwise is longer than the threshold period of time.

Then, at step S15, a standby pressure is raised one level. Specifically, the hydraulic pressure before raised stepwise next time (i.e., (n+1)th time of pressure rise) is increased slightly. Consequently, the hydraulic pressure applied to the clutch 7, 15, or 31 is raised gradually and stepwise, and thereafter, the routine returns. In this situation, if the execution condition to learn the initial engagement position of the clutch at step S1 of the routine shown in FIG. 5 is satisfied, the routine shown in FIG. 6 is repeated from S11.

By contrast, if the reaction time is shorter than the threshold period of time so that the answer of step S13 is YES, the routine progresses to step S14 to turn on the learning execution flag (n).

In this case, the clutch 7, 15, or 31 starts to be engaged by the hydraulic pressure raised stepwise. Therefore, the control system determines that the clutch 7, 15, or 31 is brought into a suitable condition to learn the initial engagement position.

Then, at step S17, it is determined whether the condition to learn the initial engagement position of the clutch 7, 15, or 31 is satisfied consecutively. In other words, at step S17, it is determined whether the learning execution flag (n) is turned on every time the hydraulic pressure is raised stepwise. Specifically, in the example shown in FIGS. 7 and 8, it is determined whether the learning execution flag (n−2) is turned on at point t2 (i.e., on (n−2)th time of pressure rise), the learning execution flag (n−1) is turned on at point t3 (i.e., on (n−1)th time of pressure rise), and the learning execution flag (n) is turned on at point t4 (i.e., on (n)th time of pressure rise).

If the condition to learn the initial engagement position of the clutch 7, 15, or 31 is not satisfied consecutively, in other words, if at least any one of the learning execution flag (n−2), (n−1), and (n) is turned off so that the answer of step S17 is NO, the routine progresses to step S15 to raise the standby pressure one level. That is, the hydraulic pressure applied to the clutch 7, 15, or 31 is further raised stepwise.

By contrast, if the condition to learn the initial engagement position of the clutch 7, 15, or 31 is satisfied consecutively, that is, if all of the learning execution flag (n−2), (n−1), and (n) is turned on so that the answer of step S17 is YES, the routine progresses to step S18 to learn the standby pressure on the (n−2)th time of pressure rise as a reference pressure level.

That is, at step S18, the hydraulic pressure before raised on (n−2)th time is stored as the hydraulic pressure corresponding to the initial engagement position of the clutch 7, 15, or 31. In other words, the packing pressure to reduce the clearance in the clutch 7, 15, or 31 is updated, and thereafter the routine returns.

Thus, according to the exemplary embodiment of the present disclosure, the initial engagement position of the clutch 7, 15, or 31 is learnt by engaging the clutch 7, 15, or 31 stepwise and gradually, while maintaining the input speed Ni of the clutch 7, 15, or 31 to the constant speed, while maintaining the speed Ne of the engine 1 or the speed Nm of the first motor 2 to the constant speed, or while maintaining the input current Im to the first motor 2 to the constant value. During such procedures, the initial engagement position of the clutch 7, 15, or 31 is learnt when the clutch 7, 15, or 31 starts engaging so that the reaction time until the input speed Ni, the speed Ne, the speed Nm, or the input current Im is reduced shorter than the threshold period of time.

As indicated in FIGS. 7 and 8, the clearance in the clutch pack of the clutch 7, 15, or 31 is still large in the initial phase of the pressure rise, and the clutch 7, 15, or 31 has not yet been engaged when the hydraulic pressure is increased e.g., at point t0. In this situation, as indicated as calculation data A and B in FIG. 9, the input speed Ni, the speed Ne, the speed Nm, or the input current Im has not yet been changed in spite of raising the hydraulic pressure applied to the clutch 7, 15, or 31 stepwise. Then, the input speed Ni, the speed Ne, the speed Nm, or the input current Im is changed with an increase in the hydraulic pressure applied to the clutch 7, 15, or 31. For example, although the reaction time at point t1 is long, the input speed Ni, the speed Ne, the speed Nm, or the input current Im is changed as indicated as calculation data C in FIG. 9. In this situation, however, the reaction time is still longer than the threshold period of time.

As described, oil is used ion the wet-type clutch, and steering resistance is increased at low temperature due to increase in viscosity of the oil. At low temperature, therefore, torque may be transmitted between the input element and the output element of the clutch by the steering resistance before the clutch is brought into engagement. If the initial engagement position of the clutch is learnt in such situation, the initial engagement position of the clutch may not be learnt accurately. In order to learn the initial engagement position of the clutch accurately, according to the exemplary embodiment of the present disclosure, the learning of initial engagement position of the clutch is not executed if e.g., the input speed Ni of the clutch is changed but the reaction time is long as indicated by the arrow T1 in FIGS. 7 and 8. In other words, if e.g., the input speed Ni of the clutch is changed but the reaction time is long as indicated as the calculation data C in FIG. 9, the learning of initial engagement position of the clutch is not executed. According to the exemplary embodiment of the present disclosure, therefore, the initial engagement position of the clutch may be learnt accurately without being influenced by the temperature.

According to the exemplary embodiment of the present disclosure, specifically, the learning of initial engagement position of the clutch is executed if the condition to learn the initial engagement position of the clutch is satisfied consecutively. In other words, the learning of initial engagement position of the clutch is executed if the reaction time until e.g., the input speed of the clutch starts changing is shorter than the threshold period of time consecutively as indicated as calculation data C and D in FIG. 9. Specifically, as shown in FIGS. 7 and 8, the learning of initial engagement position of the clutch is executed if the reaction times T2 on the (n−2)th time of pressure rise, T3 on the (n−1)th time of pressure rise, and T4 on the (n)th time of pressure rise are shorter than the threshold period of time respectively. According to the exemplary embodiment of the present disclosure, therefore, the initial engagement position of the clutch may be learnt accurately without being influenced by variation in the calculation data.

Although the above exemplary embodiments of the present disclosure have been described, it will be understood by those skilled in the art that the present disclosure should not be limited to the described exemplary embodiments, and various changes and modifications can be made within the scope of the present disclosure.

What is claimed is:

1. A control system for a vehicle comprising:
   a prime mover;
   at least one pair of drive wheels;
   a clutch that selectively transmits power between the prime mover and the drive wheels, and that selectively interrupts power transmission between the prime mover and the drive wheels; and
   a detector that detects an input speed of the clutch rotated by an output torque of the prime mover,
   the control system comprising:
   a controller that controls the prime mover and the clutch, and that learns and corrects an initial engagement position of the clutch,
   wherein the controller is configured to
   maintain the input speed of the clutch to a constant speed by the output torque of the prime mover, and
   execute a learning of the initial engagement position of the clutch, if a reaction time until the input speed of the clutch is changed by engaging the clutch gradually while maintaining the input speed of the clutch to the constant speed is shorter than a threshold period of time.

2. The control system for the vehicle as claimed in claim 1,
   wherein the prime mover includes a motor,
   the detector is configured to detect an input current to the motor, and
   the controller is further configured to
   maintain the input speed of the clutch to the constant speed by an output torque of the motor, and
   execute the learning of the initial engagement position of the clutch, if a reaction time until the input current to the motor is changed by engaging the clutch gradually while maintaining the input speed of the clutch to the constant speed is shorter than another threshold period of time.

3. The control system for the vehicle as claimed in claim 1,
   wherein the prime mover includes an engine, and
   the clutch includes a wet-type friction clutch that transmits the output torque of the engine to the drive wheels when launching the vehicle.

4. The control system for the vehicle as claimed in claim 1,
   wherein the vehicle further comprises an automatic transmission that transmits torque between the prime mover and the drive wheels, and
   the controller is further configured to control the automatic transmission, and execute the learning of the initial engagement position of the clutch while establishing a predetermined gear stage or speed ratio by the automatic transmission.

5. The control system for the vehicle as claimed in claim 4, wherein the automatic transmission comprises a plurality of friction clutches that are manipulated to establish the predetermined gear stage or speed ratio, and that are disengaged to interrupt torque transmission between the prime mover and the drive wheels, and the clutch includes any one of the plurality of friction clutches of the automatic transmission.

6. The control system for the vehicle as claimed in claim 1, wherein the prime mover includes an engine, and a first motor that is connected to the engine in a power transmittable manner, the vehicle further comprises a second motor that is connected to the drive wheels in a power transmittable manner to serve as another prime mover, and the controller is further configured to execute the learning of the initial engagement position of the clutch while generating a drive torque by the second motor and driving the first motor as a generator by the engine.

7. The control system for the vehicle as claimed in claim 1, wherein the prime mover includes an engine, and a first motor that is connected to the engine in a power transmittable manner, the vehicle further comprises a second motor that is connected to the drive wheels in a power transmittable manner to serve as another prime mover, and the controller is further configured to execute the learning of the initial engagement position of the clutch while generating a drive torque by the second motor and cranking the engine by the first motor.

* * * * *